United States Patent [19]

Brackett

[11] Patent Number: 4,875,956
[45] Date of Patent: Oct. 24, 1989

[54] METHOD OF BONDING PLASTICS

[75] Inventor: Tom S. Brackett, New Britain, Conn.

[73] Assignee: Integrated Fluidics, Inc., Plainville, Conn.

[21] Appl. No.: 105,607

[22] Filed: Oct. 6, 1987

[51] Int. Cl.$^4$ ............................................. B32B 31/12
[52] U.S. Cl. ...................................... 156/84; 156/153; 156/257; 156/308.2; 156/381; 264/230; 264/342 R; 264/DIG. 71
[58] Field of Search ...................... 156/83, 308.2, 153, 156/84, 85, 257, 322, 281, 381, 245; 137/884; 264/342 R, 2.7, DIG. 71, DIG. 57, 230

[56] References Cited

U.S. PATENT DOCUMENTS

| | | | |
|---|---|---|---|
| 2,361,589 | 10/1944 | Bennett et al. | 264/1.7 X |
| 2,533,609 | 12/1950 | Nolan et al. | 264/230 X |
| 2,963,394 | 12/1960 | Wilkinson | 156/308.2 X |
| 3,016,066 | 1/1962 | Warren | 137/836 |
| 3,144,037 | 8/1964 | Cargill et al. | 137/837 X |
| 3,193,424 | 7/1965 | Scott | 156/153 X |
| 3,409,198 | 11/1968 | Peterman, Sr. | 156/281 X |
| 3,632,841 | 1/1972 | Fortin | 264/2.7 X |
| 3,645,824 | 2/1972 | Patton | 156/322 |
| 3,647,592 | 3/1972 | Woodberry | 156/322 X |
| 3,661,677 | 5/1972 | Wang | 156/322 X |
| 3,668,756 | 6/1972 | Wieme | 29/424 X |
| 3,739,055 | 6/1973 | Ueda et al. | 264/342 |
| 3,814,785 | 6/1974 | Reade | 264/89 |
| 3,872,563 | 3/1975 | Brown et al. | 156/257 X |
| 4,211,594 | 7/1980 | Freitag et al. | 156/158 |
| 4,240,855 | 12/1980 | Pennington | 156/159 |
| 4,247,514 | 1/1981 | Luise | 264/345 |
| 4,315,050 | 2/1982 | Rourke | 428/116 |
| 4,339,400 | 7/1982 | Sorko-Ram | 264/2.7 X |
| 4,342,071 | 7/1982 | Chamberlain | 362/310 X |
| 4,355,076 | 10/1982 | Gash | 428/411 |
| 4,357,190 | 11/1982 | Fouss et al. | 156/244.13 |
| 4,361,527 | 11/1982 | Rau | 264/2.7 X |
| 4,384,016 | 5/1983 | Ide et al. | 156/308.2 X |
| 4,390,383 | 6/1983 | van Dongeren | 156/196 |
| 4,390,384 | 6/1983 | Turner | 156/221 |
| 4,601,861 | 7/1986 | Pricone et al. | 264/1.6 |
| 4,648,925 | 3/1987 | Goepfert et al. | 156/153 |
| 4,721,541 | 1/1988 | Hodges | 156/257 X |

FOREIGN PATENT DOCUMENTS 1918081  3/1973  Fed. Rep. of Germany ...... 137/884

OTHER PUBLICATIONS

L. S. Luskin, "Acrylic", Modern Plastics Encyclopedia, 1983-1984, pp. 14-18.

Primary Examiner—Michael W. Ball
Assistant Examiner—Jeff H. Aftergut
Attorney, Agent, or Firm—Hamilton, Brook, Smith & Reynolds

[57] ABSTRACT

A method of producing a fluidic module from two or more pieces of plastic material having an intermolecular bonded interface, comprises forming an interface surface on each piece, forming at least one fluidic passageway in at least one of the interface surfaces, assembling the pieces with the interface surfaces in contact with each other and confining them against expansion. Heat is applied to the assembled pieces to induce their expansion against their confinement to cause transmigration of molecules from one interface surface to the other to bond the pieces together.

6 Claims, 3 Drawing Sheets

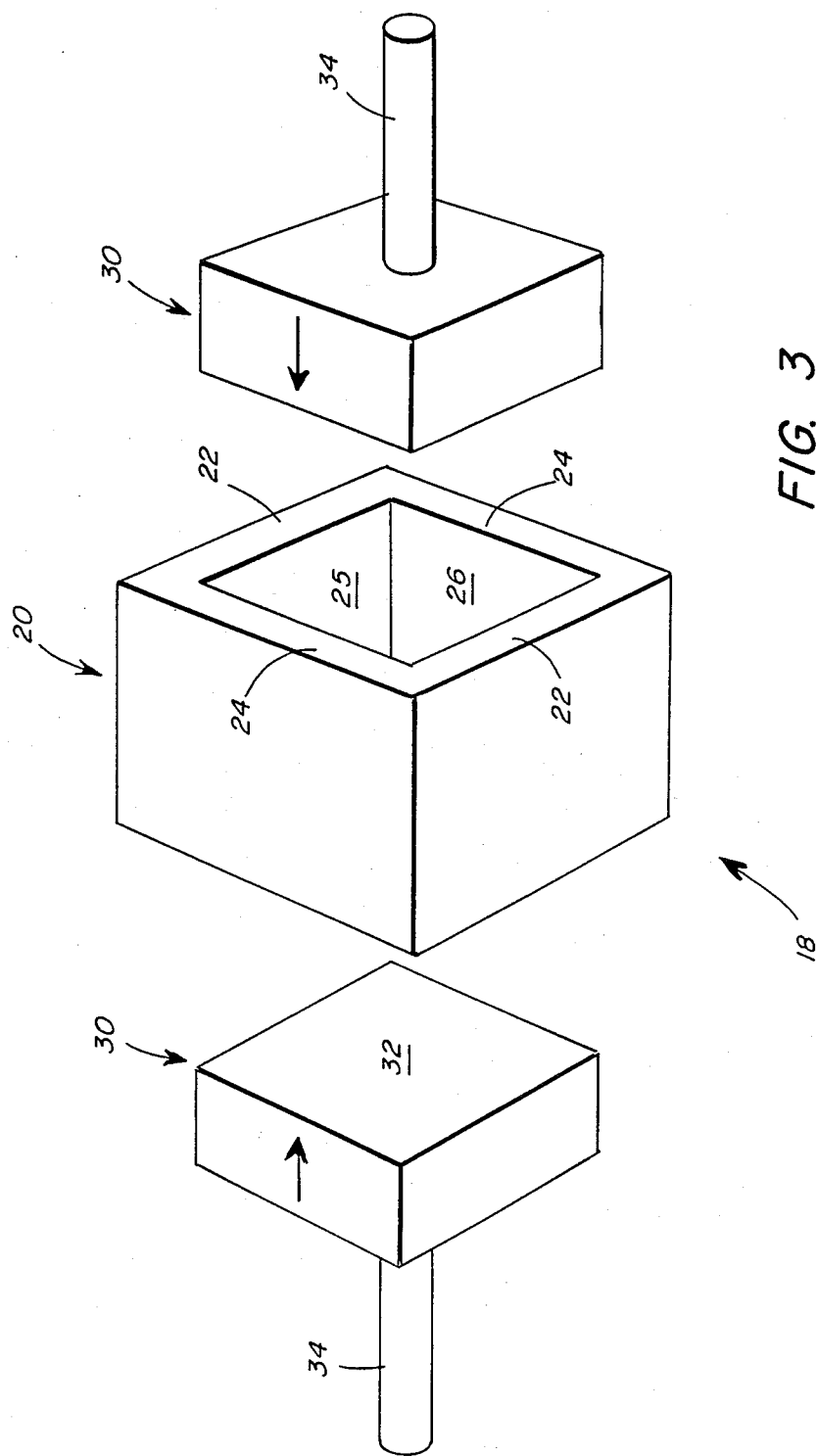

METHOD OF BONDING PLASTICS

FIELD OF THE INVENTION

This invention relates to the joining of solid pieces of plastic material, such as acrylic, at an interface to produce an intermolecular bond which, when viewed normal to the interface, is virtually invisible. The invention is particularly valuable in the production of fluidic valves and manifolds. Because of this, there may be formed at the interface various conduits, paths, ports, cavities, and the like, for conducting gasses and/or fluids in a plurality of directions without leakage. Valves and even electronic elements may be located at the interface integrated with the passageways and encapsulated in a fluid and airtight bond.

BACKGROUND OF THE INVENTION

Fluidic valves and manifolds are in common use today in technologies requiring complicated control of the flow of gasses and/or fluids in fields such as medical processing equipment and the like. Essentially, the manifolds or valves comprise solid blocks, often of plastic material, having an internal maze of interconnected passageways, channels, ports and cavities, which, if not contained within a module, would require a substantially larger and more complicated assemblage of tubes, hoses, receptacles and chambers to be assembled. Many of the channels are not linear but rather are arcuate. Some intersect at angles and are three dimensional.

It is virtually impossible to drill a curved channel or passageway wholly within a solid block. However, a curved channel can be milled in a surface of a block and that surface can subsequently be joined to a surface of another block to produce a curved channel. Likewise, some passageways have to be at least an inch or more in length and are very narrow, often the size of a needle. Drilling such passageways in plastic, such as acrylic, while maintaining close tolerances, is extremely difficult. Accordingly, fluidic valves or manifolds have been made by machining various passageways, ports, openings and conduits in one surface of a plastic block, and then attaching another block to that surface whereby the passageways are then located in the interior of the combined blocks. As an alternative, occasionally both halves of the combined blocks are machined with mirror-image configurations in their mating surfaces which surfaces subsequentially are brought together into intimate contact. This invention is directed to the process of bonding such surfaces together to form a module and to make fluidic valves and manifolds.

It is essential that the contacting surfaces be airtight, particularly if the module is to be used for valving or conducting pressurized fluids or gasses. It is obvious that the component halves could be screwed or bolted together but this causes stress concentration and only assures tightness in the areas immediately surrounding the screw or bolt. Furthermore, since the modules are frequently small, room is not available for locating screws or bolts which would otherwise interfere with the passageways or valves.

It would also be obvious to clamp the members together but this adds to the bulk and would cut down on the visibility.

Another method which immediately comes to mind as an expedient for securing together the component halves, is through the use of glue or cement. This is unacceptable for a number of reasons. Cements can contaminate the gasses or fluids flowing through the passageways in the modules. Furthermore, if not extremely carefully applied, cement can leak into and partially or completely block the passageways. Furthermore, gluing or cementing frequently results in the presence of bubbles which can be detrimental to the optical properties of the moleules. Also, in many instances, it is not only desirable but mandatory that the passageways be readily visible for inspection of the passage of fluids or gasses. Glue or cement can change the index of refraction between the two component halves or render the interface opaque.

It is thus an object of the present invention to be able to secure two or more component portions of a module together without the use of screws, glues or any third element.

SUMMARY OF THE INVENTION

An intermolecular bonded interface between two pieces of plastic material is produced by the following combination of steps. First, the plastic pieces are pre-shrunk to obtain dimensional stability. Thereafter, an interface surface is formed on each piece, the surfaces conforming in shape with each other. The interface surfaces are then cleaned to free them of contaminents, after which the pieces are assembled with the interface surfaces in contact with each other. All of the external surfaces of the pieces are confined against expansion and they 10 are then heated to induce expansion of the pieces against their confinement. This expansion causes transmigration of molecules from one interface to the other to bond the pieces together.

Utilizing the basic process, a fluidic module can be made from two or more bonded plastic pieces by forming at least one fluidic passageway in at least one of the interface surfaces. As an alternative, a fluidic passageway which is a mirror image of the first one, is formed in the other interface surface. Pieces are then assembled, confined and heated as described above.

Optionally, the interface surfaces may be subjected to a second surfacing to remove any burrs at the interface. To obtain the maximum clarity at the interface, the interface surfaces may be polished prior to being cleaned, confined and heated.

The finished product may be subjected to an annealing process to relieve unwanted stresses.

The above and other features of the invention including various novel details of construction and combinations of parts will now be more particularly described with reference to the accompanying drawings and pointed out in the claims. It will be understood that the particular method of bonding plastic embodying the invention is shown and described by way of illustration only and not as a limitation of the invention. The principles and features of this invention may be employed in varied and numerous embodiments without departing from the scope of the invention.

BRIEF DESCRIPTION OF THE DRAWINGS

FIG. 3 is a perspective view of a portion of the apparatus employed in the bonding process.

DETAILED DESCRIPTION OF THE INVENTION

At least one of the materials found to be of value in the present process are the acrylics. They offer the advantages of being strong and durable, transparent, easily machined and if properly prepared, maintain their physical integrity under stress and temperature changes. Various types of acrylic materials are available in sheet form which may generally be between from about ⅛ to about 1¼ inches in thickness. Initially, the sheets are cut to the appropriate size of two components of the finished product, which for example, could be two inches square by one inch thick. These are represented as the blocks $B_1$ and $B_2$ in FIG. 1. The sides 10 and 12 are, for example, each two inches wide and one inch thick. The surfaces 2 are two inches square.

While the invention will be described with reference to a two-part valve module comprising blocks $B_1$ and $B_2$, it should be understood that modules of three or more components are possible. Furthermore, the process is equally applicable to making of a plurality of modules simultaneously in mass production.

While the invention will be described relative to a rectangular module it could be of any other configuration, as for example cylindrical.

Figure 2:
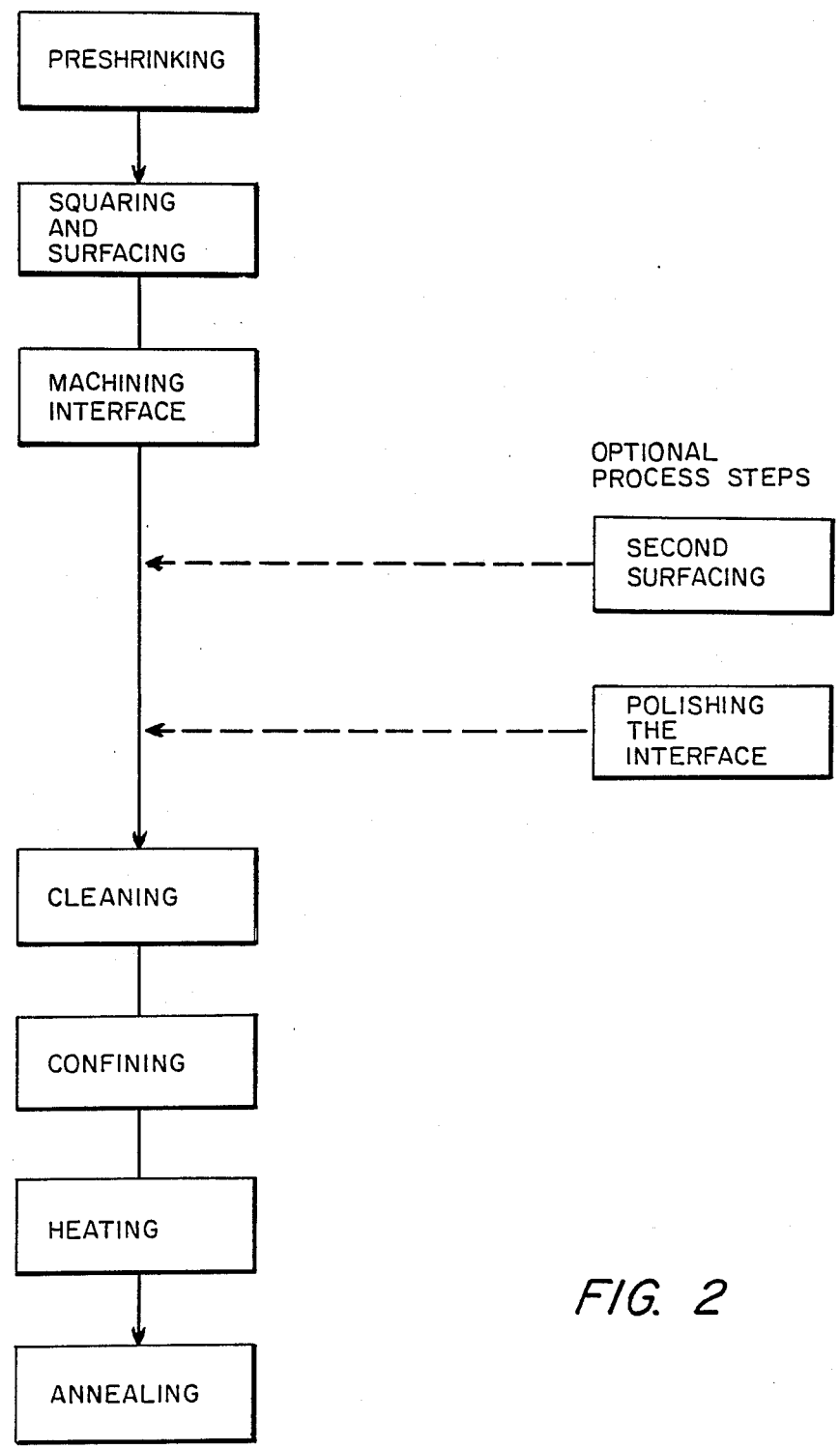
FIG. 2 is a flow diagram of the processing steps involved in carrying out the invention.

Referring to FIG. 2, the process steps will be seen in a block diagram. The first step is preshrinking. After the parts or components are cut to approximate size, they are preshrunk before being machined. Preshrinking assures that the most accurate dimensions can be maintained in the finished product. If the parts were machined without being preshrunk, subsequent annealing could cause the grooves, channels and other configurations to change dimensionally.

Preshrinking is not merely a temporary state but once having been preshrunk, the acrylic material retains its dimensional stability even after machining, annealing or other stressful processes. Because of the structure of cast acrylic, shrinkage in two directions results in an increase in size in another. This may be akin to a conservation of volume. In the preshrinking process, the block will shrink along one or two axes and increase along another. This is due to the prestressed molecular structure created during its manufacturing process.

Figure 1:
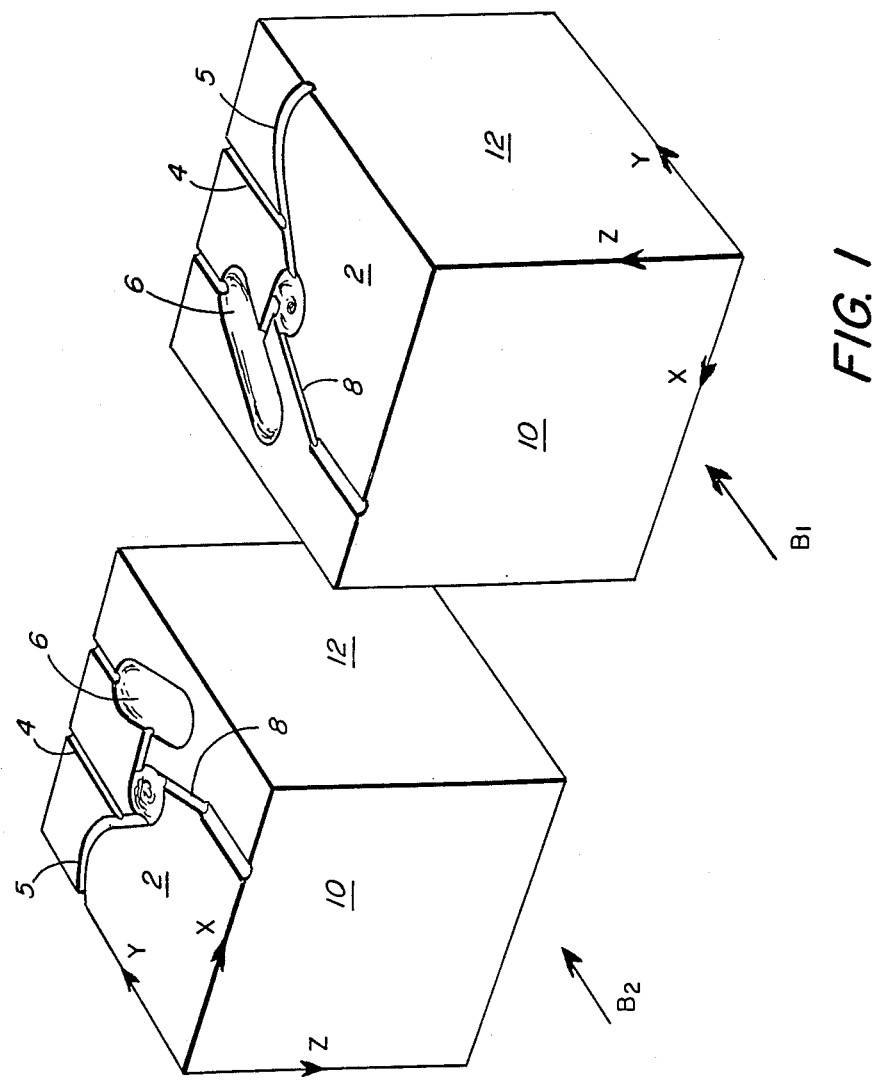
FIG. 1 is a perspective view on an enlarged scale of two component portions of a fluidic valve module prior to their being bonded in accordance with the present invention.

The block is placed in an annealing oven where it is shrunk in two directions and enlarged in the third. In other words, as seen in FIG. 1, it might decrease in size along the X and Y axes and increase along the Z axis or any combination of two axes.

Typically, a block which is two inches by two along the X and Y axes and one inch along the Z axis is placed in an annealing oven. The temperature is raised gradually to approximately 185° F. over a period of about 6 hours where it is maintained for about 8 hours. It is then allowed to cool slowly for about 6 hours. Heat can penetrate a small block more quickly than a large block, the larger the piece, the longer the heating time. The block(s) are then allowed to cool.

Once having been preshrunk the block retains that size and does not change dimensions in subsequent manufacturing processes. Furthermore subsequent annealing will not add to the shrinking process. In other words, the block becomes stable after preshrinking, it does not drift in dimension.

The next step is squaring and surfacing the block(s) to prepare their surfaces for further processing. This step is performed by machining a block so that its opposite sides are parallel and their contiguous sides are square relative to each other. This is performed by conventional machining processes, as for example, by flycutting. As a result of the preshrinking step, the orientation of the blocks relative to their original orientation before being cut from the sheet material is immaterial. However, proper surface preparation is essential. Very little stock is removed from the block per pass, in fact the flycutter which rotates at a very high speed, virtually only skims the surface of the block.

The flycutting technique as practiced today, produces a series of microscopically small arcuate hills and valleys in the surface of the work piece. Short of polishing, it is the smoothest surface cutting technique available. Each block of the module is prepared in this manner.

The next step in the process is the machining of the desired fluidic configuration in one or both of the the interface surfaces. While this step is not essential to effect a bond at the interface, it is necessary to produce a functional valve or manifold. As seen in FIG. 1 the blocks $B_1$ and $B_2$ both have their interface surfaces 2 machined with a plurality of channels 4 and 5, pockets 6, and passageways 8, etc. In the example shown in FIG. 1 both of the surfaces 2 are machined as mirror images of each other. If however, the passageways were formed only as semicircular grooves in the block $B_1$ when the blocks are assembled, the passageways would be semicircular in cross-section, but when the passageways are formed half from block $B_1$ and half in that block $B_2$ the combined passageway is circular in configuration and twice the crosssectional area. If the fluidic pattern is formed in only one of the surfaces 2, say block $B_1$ for example, when the block $B_2$ having no machining in its surface 2 is secured to $B_1$, each of the passageways, channels, pockets or holes would have one flat side.

It is also within the scope of this invention that various components such as valves, electronic components and the like can be inserted into the surface 2, as for example by holes being drilled and components pressed into them. Likewise, various materials in sheet form, as for example, Mylar—a polyethylene film sold by the duPont Company, may be positioned at the interfaces to subsequently be encapsulated in the assembled module comprising blocks $B_1$ and $B_2$.

In addition to clear acrylic, successful bonding has taken place between black and/or white and clear and various colors or other color to color.

The cutting operation is by conventional machine tools with dimensions being taken from the presmoothed and squared surface 2. Note that passageway 5 is curved, having been milled in the surfaces 2.

Even with the most precise machining it is possible that burrs can be produced at the edges of the cuts or grooves. To remove such burrs or irregularities, the surfaces 2 may be subjected to another or second surfacing treatment, as for example by flycutting. Only a minimum amount of stock is removed from the surface. This is so as not to interfere with the precut fluidic pattern in order to maintain the tolerances of the various channels and grooves 4, 5, 6 and 8. This process step is optional.

If desired, rubber gaskets or O-Rings can be inserted in pre-drilled holes in the surfaces 2 if needed for the operation of the module. Furthermore, magnetic stirrers could also be included. This is done preferably by press or forced fitting them into holes to eliminate the need for adhesives which could be detrimental to the fluids or gasses subsequently to flow through the module.

The second surfacing step not only gets rid of burrs but also improves the overall surface finish. For example, if the initial squaring technique were performed with a heavy cut, the second of the surfacing steps by comparison would be essentially a polishing step.

Up to this point there has been no cleaning steps although conventional use of fluids are employed during the various cutting operations, primarily for cooling the work piece and for chip removal.

The next step to be performed is that of polishing. This is not absolutely essential to all processes but in some instances it is required, for example, where fluid flow requirements dictate that the actual channels or passageways have to be polished. This may be done by conventional polishing processes.

Under certain circumstances the actual interface surfaces 2 are polished prior to bonding. This is done primarily to improve the transparency of the ultimate bonded interface. Conversely, if it is desired to assure that the actual channels and passageways 4, 5 and 8 be visible, they would be left unpolished and the interface 2 polished. In the completed bonded module the somewhat greyish machined finish of the channels would make them more visible.

The polishing step of the interface 2 is performed primarily to make the ultimate bonded interface more clear than if the flycut surfaces were bonded together. Buffing and/or sanding and lapping techniques may be used in polishing the surface as well as the use of chemical vapors. Flame polishing techniques may also be incorporated. Vapor polishing would be used in that case. Vapor polishing is the technique of choice for getting inside small holes.

As seen in FIG. 2 the next step in the process is cleaning the surface 2. This may be done as simply as by the use of soap and water or more commonly is done by the commercial ultrasonic Freon Tank Method. Any contaminant or foreign body must be removed from the surfaces such as oil or chips of the acrylic from the machining steps. The Freon Tank Method includes a plurality of emersion steps.

The next process step is defined broadly as confining as seen in FIG. 2.

Referring next to FIG. 3, there will be seen a containing fixture 18. It comprises a hollow block 20 having parallel walls 22 and 24. Were the blocks cylindrical, the interior of the fixture would be cylindrical. The inner surfaces 25 and 26 of the walls are perfectly flat. They are just large enough to accept the blocks $B_1$ and $B_2$ in a sliding fit. The two blocks $B_1$ and $B_2$ are placed and thus combined within the fixture block 20 with their interface surfaces 2 in engagement with each other. The surfaces 10 and the surfaces 12 of the blocks then each constitute a continuous flat surface in engagement with one of the surfaces 25 or 26.

Inserts 30 which have the same configuration as the opening in the fixture 20 are moved toward each other into the fixture from opposite sides. Each of the inserts 30 has a flat surface 32 which engages an opposite side of the block $B_1$ or $B_2$ which is parallel to the interface surface 2. Whereas FIG. 3 shows the fixture schematically with simple handles 34 it will be understood that the inserts 30 can be machined operated. The inserts 30 are moved towards each other to a predetermined stop point pressing against the blocks $B_1$ and $B_2$.

The fixture 20 may be made of aluminum or any other good heat conducting material. The insides 25 and 26 of the walls 22 and 24 are smooth and highly polished since they are to impart a polished appearance to the surface of the acrylic module which comes in engagement with them.

Once the inserts 30 have been moved into position to the predetermined stop points and are against the acrylic components $B_1$ and $B_2$, they are not moved further. It is to be emphasized that the inserts 30 do not continuously move during the bonding process but rather, once having be set to a predetermined spaced part distance they remain at that distance. Thus, it will be seen that the assembled module made up of the two components $B_1$ and $B_2$ is confined on all six sides or, were it cylindrical, around the cylinder and on its ends.

The fixture 18, including the inserts 30 and the workpieces $B_1$ and $B_2$, are next placed in an annealing oven at a predetermined temperature and for a predetermined amount of time. By increasing the temperature the acrylic tends to expand. The pressure which the stationary inserts 30 and the walls 24 and 25 apply to the assembled components $B_1$ and $B_2$ causes the module to tend to expand normal to the directions of applied pressure which direction is shown by the arrows in FIG. 3. This forces the exterior of the module against the smooth polished walls 25 and 26 of the fixture. Obviously, the induced pressure also forces the interface surfaces 2 against one another. Simultaneously, pressure builds up at the mating interface of the surfaces 2. The pressure is a function of temperature not movement of the inserts 30 which are stationary.

The temperature is never so great as to cause the acrylic to become viscous, otherwise the machined portions 4, 5, 6 and 8, would fill up and possibly disappear. During the process, molecules at the interfaces of block $B_1$ transmigrate across to the interface of block $B_2$ and vice versa. This essentially eliminates the interface and causes the two blocks essentially to become a single block. The interface surfaces ultimately become invisible when viewed at right angles and the grooves and passageways, if they haven't been polished, stand out visibly. If however, they have been polished, while they still can be seen, they are not as readily visible as if they had not been polished.

The bonding input results from temperature increase as distinguished from pressure application because, at the outset, little or no pressure is applied to the module by the walls 25 and 26 and the inserts 30 are only moved against the opposite faces of the assembled module parts $B_1$ and $B_2$ with manual pressure. It is the temperature which causes the volumetric expansion of the module that creates the pressure.

The time of bonding is a function of the mass of the module. As examples, the following times and temperatures have been found to be satisfactory.

EXAMPLE 1

Two pieces of acrylic $B_1$ and $B_2$, each 1.50 inches square (X and Y directions) and 0.250 inches thick (Z direction), were bonded without preheating in an oven at 300° F. with the temperature varying plus or minus 10 degrees. Heating was continued for 30 minutes and the module was allowed to cool in ambient air.

EXAMPLE 2

Two pieces $B_1$ and $B_2$ each measuring 2.980 inches by 3.063 inches in the X and Y directions were bonded. One of the pieces was 0.206 inches thick, i.e., in the Z direction, and the other was 0.396 inches thick. They were heated in an oven at 300° F. with a variance of plus or minus 10° for 30 minutes with no preheating and cooled in ambient air.

EXAMPLE 3

A three layer module was successfully bonded, the outer layers each were 0.395 inches by 1.147 inches in the X and Y directions and 0.087 inches thick, i.e., in the Z direction. The inner layer was also 0.395 inches by 1.147 inches but it was 0.210 inches thick in the Z direction. Without preheating, the laminate was placed in an oven at 285° F., with a variance of plus or minus 10°, for 30 minutes and allowed to cool in ambient air.

Once reaching the bonding temperature, the temperature is not exceeded but maintained for the predetermined time. Then the ovens are allowed to cool down. At the completion of the bonding process, the then bonded module is removed from the fixture and it is allowed to cool.

The module, having undergone the application of pressure and temperature is subject to the development of internal stresses which are not desirable and which can be detected by employing cross-polarized light or ethyl acetate testing.

The stresses are removed by annealing. This is accomplished by subjecting the bonded module to heat for a predetermined period of time. The acrylic module, at this time, is unconfined. The annealing operation takes essentially eight hours at a temperature from about 170° F. to about 200° F. which is substantially lower than the bonding temperature. This causes a "settling" of the molecules of acrylic in their proper resting place, free of unwanted stress.

Subjecting the module to testing in ethyl acetate, wherein cracks develop in the stressed parts, is in effect destructive testing. This process merely indicates whether or not the module has been annealed. An annealed module does not evidence stress cracks. Consequently, any part subjected to ethyl acetate testing which does not show stress cracks, can, all things being equal, an acceptable module.

After annealing, any subsequent machining operations may be performed on the module as for example, drilling of screw holes which generally is required for mounting the module. This, in no way affects the bonding which has taken place.

I claim:

1. A method of producing a fluidic module from at least two pieces of acrylic material having an intermolecular bonded interface comprising the steps of:
   a. heating in an absence of physical deformation to preshrink the acrylic pieces to obtain dimensional stability,
   b. machining a first interface surface on the first piece and machining a second interface surface on the second surface, the interface surfaces conforming in shape to each other,
   c. machining at least one fluidic passageway in the first interface surface,
   d. removing burrs from the interface surface having the fluidic passageway,
   e. polishing both interface surfaces,
   f. assembling the pieces with the polished interface surfaces in contact with each other,
   g. confining all external surfaces of the pieces against expansion, and
   h. applying heat to the assembled pieces in an absence of externally applied pressure to induce their expansion against their confinement to cause transmigration of molecules from one interface surface to another to bond the pieces together.

2. A method according to claim 1 wherein the preshrinking is effected by heating the pieces to a temperature of approximately 185° F. over a period of about 6 hours, maintaining the temperature at approximately 185° F. for about 8 hours and allowing the pieces to cool for about 6 hours.

3. A method according to claim 1 including the step of relieving stress wherein the bonded pieces are annealed at a temperature of from about 170° F. to about 200° F. for a period of about 8 hours.

4. A method according to claim 1 wherein the heat applied to induce expansion is at a temperature from about 275° F. to about 310° F.

5. A method according to claim 1 wherein the heat is applied to the assembled pieces for about 30 minutes to induce expansion and effect bonding.

6. A method according to claim 1 wherein at least one fluidic passageway is formed in the second interface surface as a mirror image of the fluidic passageway formed in the first interface surface.

* * * * *